United States Patent
Ativanichayaphong et al.

(10) Patent No.: US 7,870,000 B2
(45) Date of Patent: Jan. 11, 2011

(54) PARTIALLY FILLING MIXED-INITIATIVE FORMS FROM UTTERANCES HAVING SUB-THRESHOLD CONFIDENCE SCORES BASED UPON WORD-LEVEL CONFIDENCE DATA

(75) Inventors: Soonthorn Ativanichayaphong, Boca Raton, FL (US); Gerald M. McCobb, Delray Beach, FL (US); Paritosh D. Patel, Parkland, FL (US); Marc White, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 954 days.

(21) Appl. No.: 11/692,741

(22) Filed: Mar. 28, 2007

(65) Prior Publication Data

US 2008/0243502 A1   Oct. 2, 2008

(51) Int. Cl.
G10L 15/16 (2006.01)
(52) U.S. Cl. ...................... 704/270; 704/240
(58) Field of Classification Search ................ 704/270, 704/240
See application file for complete search history.

(56) References Cited

U.S. PATENT DOCUMENTS

| | | | |
|---|---|---|---|
| 6,751,595 B2* | 6/2004 | Busayapongchai et al. .. | 704/275 |
| 6,934,756 B2* | 8/2005 | Maes ......................... | 709/227 |
| 6,970,935 B1* | 11/2005 | Maes ......................... | 709/230 |
| 7,032,169 B2* | 4/2006 | Ativanichayaphong et al. ........................ | 715/201 |
| 7,260,530 B2* | 8/2007 | Werner ....................... | 704/251 |
| 7,487,085 B2* | 2/2009 | Ativanichayaphong et al. ........................ | 704/235 |
| 7,487,440 B2* | 2/2009 | Gergic et al. ................ | 715/234 |
| 7,529,675 B2* | 5/2009 | Maes ...................... | 704/270.1 |

FOREIGN PATENT DOCUMENTS

WO    02/091360 A1    11/2002

* cited by examiner

*Primary Examiner*—Susan McFadden
(74) *Attorney, Agent, or Firm*—Wolf, Greenfield & Sacks, P.C.

(57) ABSTRACT

The present disclosure relates to prompting for a spoken response that provides input for multiple elements. A single spoken utterance including content for multiple elements can be received, where each element is mapped to a data field. The spoken utterance can be speech-to-text converted to derive values for each of the multiple elements. An utterance level confidence score can be determined, which can fall below an associated certainty threshold. Element-level confidence scores for each of the derived elements can then be ascertained. A first set of the multiple elements can have element-level confidence scores above an associated certainty threshold and a second set can have scores below. Values can be stored in data fields mapped to the first set. A prompt for input for the second set can be played.

12 Claims, 3 Drawing Sheets

```
<?xml version="1.0" encoding="UTF-8"?>                              310
<vxml xmlns="http://www.w3.org/2001/vxml"
xmlns:xsi="http://www.w3.org/2001/XMLSchema-instance"
xsi:schemaLocation="http://www.w3.org/2001/vxml
http://www.w3.org/TR/voicexml20/vxml.xsd" version="2.0">
<form id="vCitiesForm">
<grammar src="us_address.gram" />              312
<initial>
<prompt>
Please say your street, city, and state address.     314
</prompt>
<initial>

<field name="street">
<prompt>Please say your street.</prompt>       316
</field>
<field name="city">
<prompt>Please say your city.</prompt>         318
</field>
<field name="state">
<prompt>Please say your state.</prompt>        320
</field>
<field name="zipcode">
<prompt>Please say your zip code.</prompt>     322
</field>
<filled namelist="street city state zipcode">
<goto next="get.billing.info.vxml"/>
</filled>
</form>
</vxml>
```

```
#ABNF 1.0 iso-8859-1;                                               340
language en-US;

mode voice;
root $us_address;
tag-format <semantics/1.0>;
                                                            342
public $us_address = $street $city $state $zipcode
{ $.street=$street; $.city=$city; $.state=$state; $.zipcode=$zipcode; };
                                                            344
$street = $<number.gram> $street_name $street_type
 { $=$<number.gram>+' '+$street_name+' '+$street_type; }
| $street_name $street_type { $=$street_name+' '+$street_type; };
$street_name = ...
| colony { $="Colony"; }
| commercial { $="Commercial"; }
| congress { $="Congress"; }
| connecting { $="Connecting"; }
| consolata { $="Consolata"; }
| ... ;
$street_type = avenue { $="Ave."; } boulevard { $="Blvd."; }; ...
$city = ...
| Boca [Raton] { $="Boca Raton"; }
|
$state = Alabama { $="AL"; }
| Alaska { $="AK"; }
...
| Florida { $="FL"; }
...
| Wyoming { $="WY"; };
$zipcode = ... ;
```

FIG. 3

PARTIALLY FILLING MIXED-INITIATIVE FORMS FROM UTTERANCES HAVING SUB-THRESHOLD CONFIDENCE SCORES BASED UPON WORD-LEVEL CONFIDENCE DATA

BACKGROUND

1. Field of the Invention

The present invention relates to the field of speech processing, and, more particularly, to partially filling mixed-initiative forms from utterances having confidence scores below a threshold based upon word-level confidence data.

2. Description of the Related Art

VoiceXML documents define applications as a set of named dialog states. The user is always in one dialog state at any time. Voice XML dialogs include forms and menus. A form defines an interaction that collects values for each of a set of fields in the form. Each field can specify a prompt, the expected input, and evaluation rules. Additionally, each dialog state has one or more grammars associated with it that are used to describe the expected user input which includes spoken input and/or touch-tone (DTMF) key presses.

Two means are commonly used to gather data to fill multiple form items. One means to gather data assigns a specific grammar to each form item and utilizes a Form Interpretation Algorithm (FIA) to visit each form item until each one is filled with data provided by a user. The second means collects multiple pieces of information in a single dialog state. This type of form is a mixed-initiative form associated with a form-level grammar.

Since a form-level grammar supports filling multiple fields, it is more complex and the associated speech utterances are longer than utterances associated with filling a single field. Longer utterances have a relatively high probability of returning NO_MATCH results and in being incorrectly recognized by a speech recognition engine. Each recognized utterance is typically associated with an utterance-level (e.g., a form-level or phrase-level) confidence score. When this utterance-level confidence score is below a designated confidence threshold, a user will typically be re-prompted for the full utterance in hopes that a new utterance will result in a higher confidence score. Being forced to repeat a complete utterance can be time consuming and frustrating to user.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 provides code for a sample mixed-initiative form and a sample grammar document, where the form is able to be partially filled in based upon word confidence scores in accordance with an embodiment of the inventive arrangements disclosed herein.

DETAILED DESCRIPTION OF THE INVENTION

Figure 1:
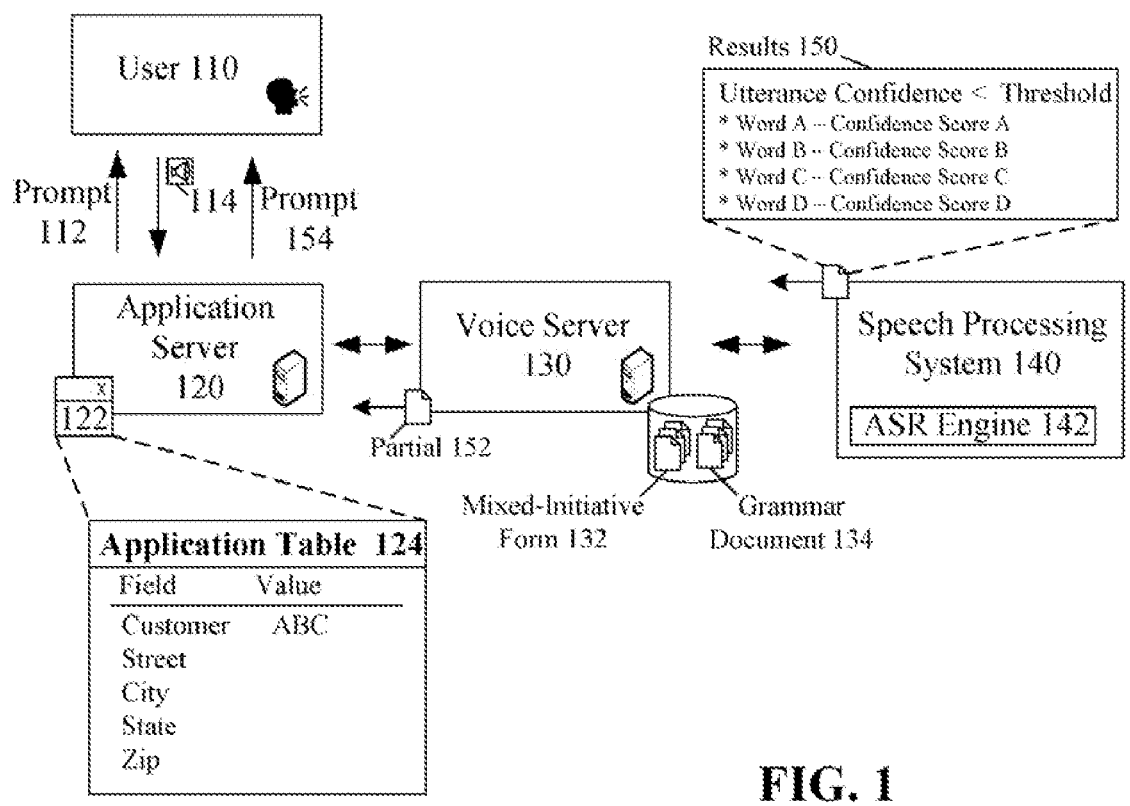
FIG. 1 is a schematic diagram of a system for partially filling mixed-initiative forms when a confidence score of an utterance prevents all fields of the mixed-initiative form from being filled.

FIG. 1 is a schematic diagram of a system 100 for partially filling mixed-initiative forms when a confidence score of an utterance prevents all fields of the mixed-initiative form from being filled. More specifically, system 100 determines word-level confidence scores for each word in a spoken phrase 114. When the phrase 114 has an insufficient phrase confidence score to be used to determine values for a complete set of fields, a portion of the fields (e.g., those associated with one or more words recognized with a high confidence) in the set can be completed. A speaker can then be prompted 112 to provide values for the unfilled fields only.

System 100 can include an application server 120 executing a speech-enabled application 122. The application 122 can interact with a user 110 using a voice-only interface and/or multimodal interface that accepts voice input and presents voice output. The speech-enabled application 122 can be written in a voice markup language (e.g., Voice XML) or a hybrid markup language (e.g., X+V) that has voice handling capabilities. Additionally, the application 122 can have interface routines written in one programming language (e.g., JAVA or C) and can use language code written in voice markup language to handle speech related tasks.

One or more mixed-initiative forms 132 can be associated with user fillable fields of the speech-enabled application. For example, a mixed initiative form 132 can be associated with a residence address of a customer, where the residence address includes fields for street, city, state, and zip code as shown by table 124. Additionally, each mixed-initiative form 132 can be associated with a grammar document 134. The grammar document 134 can specify a fixed format grammar, such as an Extensible Markup Language (XML) Speech Recognition Grammar Specification (SRGS) based grammar or an augmented Backus-Naur form (ABNF) based grammar.

A speech processing system 140 having an automated speech recognition (ASR) engine 142 can perform speech recognition tasks for system 100. The speech processing system 140 can match a user provided utterance 114 against an associated grammar specified by grammar document 134. Matching the utterance 114 involves first producing parse-tree, which can be considered an instance of an active recognition grammar. When system 140 produces recognition results 150 for the utterance 114, it can include an utterance match and an associated utterance (phrase-level) confidence score.

The phrase-level score is mathematically generated by combining confidence scores associated with branches of the parse-trees. One or more of these branches can be an intermediate branch, which has multiple leaves, each leaf having a recognized word and an associated confidence score. A confidence score for the intermediate branch can be a mathematical result based upon its leaf nodes. Further, each work in the utterance can have an associated word-level confidence score. It should be noted that some commercial speech processing systems 140 (e.g., IBM Embedded Speech Recognizer) are able to automatically provide a confidence score for each word in a recognized utterance.

When an utterance confidence score of result 150 is less than an associated phrase-level threshold, results 150 are believed to be too uncertain to complete all entries in the associated mixed-initiative form 132. System 100 can, however, use the word level confidence scores to fill-in a portion of the fields. That is, word level confidence scores can propagate up a parse-tree to branch nodes, each of which is associated with a field. When a branch node confidence score is greater than a branch-level threshold, the associated field can be completed, which is represented by a conveyance of a partial document 152. Partial document 152 can be used to establish values for a partial set of the fields associated with a mixed-initiative form 132. For example, values for city, state, and zip can be contained in partial document 152 in a situation where street has too low of a branch-level confidence score. The user 110 will be re-prompted 154 to complete the unfilled fields.

It should be appreciated that different grammar weights can be applied to branches of the parse-tree. These grammar weights can be configurable by an authorized administrator, by application 122 routine and/or by the user 110. Configuring the grammar weights affects a manner in which the phrase-level and branch-level confidence score is generated. For example, the city field can be more heavily weighted than the state filed when determining a phrase-level confidence score for a full address. In another example, a street name and number can be more heavily weighed than a street type when determining a branch-level confidence score for a street field.

Figure 2:
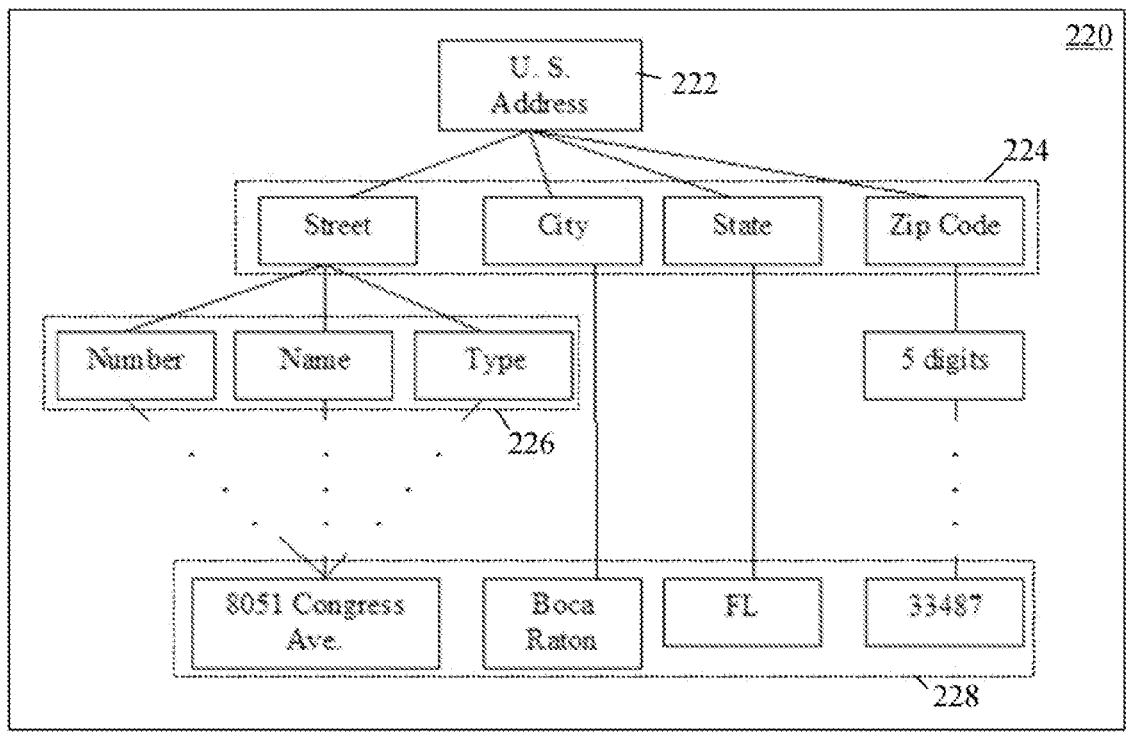
FIG. 2 is a diagram illustrating a use of a system able to partially fill mixed-initiative forms in accordance with an embodiment of the inventive arrangements disclosed herein.
Figure 2:
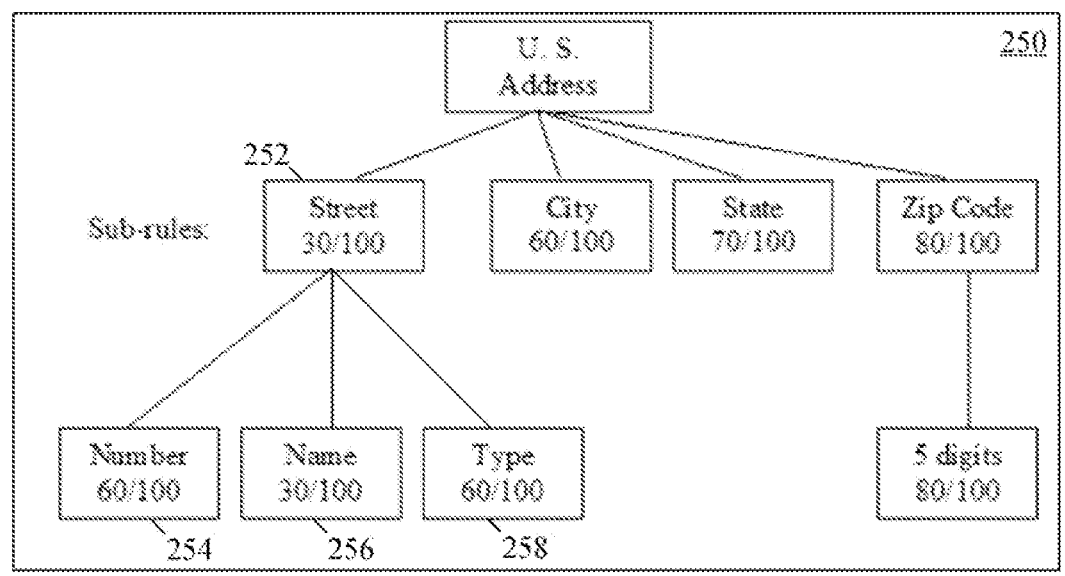

FIG. 2 is a diagram 200 illustrating a use of a system (e.g., system 100) able to partially fill mixed-initiative forms in accordance with an embodiment of the inventive arrangements disclosed herein. In diagram 200, a voice response system can prompt 210 a user to provide a street, city, state, and zip code. The customer can speak their response 212, which in the example is "8051 Congress Avenue, Boca Raton, Fla. 33487".

A parse-tree 220 can be generated, which is an instance of a grammar corresponding to a mixed-initiative form for the full address. The parse tree 220 can include a root node of U.S. Address 222, with branch nodes 224 of street, city, state, and zip code. The street node 224 can include branching nodes 226 for street number, street name, and street type. A speech recognition engine can match values 228 to each of the branching nodes 226. A form-level (e.g., phrase-level) confidence scores for the U.S. Address 222 node can be less than a previously designated confidence threshold, which initiates that the spoken utterance 212 has not been recognized with sufficient confidence to completely fill fields of the multi-initiative form for which the prompt 210 was directed.

During a matching phrase for the utterance 210, a speech recognition engine can determine confidence scores for each spoken work of the utterance 210. For example, word confidence scores 240 can be generated as follows: "8051"-60/100; "Congress"-30/100; "Avenue"-60/100; "Boca"-80/100; "Raton"-60/100; "Florida"-70/100; and "33487" 80/100. In this example, confidence scores are indicated as values 0-100, with 100 representing a score of 100% confidence.

Parse-tree 250 includes one contemplated algorithm for applying word-level confidence scores to node values. Here, a lowest confidence score of a child node is iteratively propagated upward to a parent node. That is, since a street node 252 is a parent of a number node 254, a name node 256, and a type node 258, the lowest confidence score for nodes 254-258 (e.g., confidence score of 30/100 for the name node) is propagated upwards to the street node 252.

Assuming a branch-level confidence threshold is established at 50/100, the street node 252 (e.g., confidence score of 30/100) falls below this threshold, while all other branch level nodes exceed the branch-level threshold (e.g., city-60/100, state-70/100", and zip code-80-100). Consequently, a city field can be filled in with "Boca Raton", a state field can be filled in with "Florida", and a zip code field can be filled in with "33487". A user will be re-prompted to speak or otherwise re-input a street address.

It should be appreciated that the above example is for one potential algorithm for applying word-level confidence scores (also called a percolation algorithm) to node values and that the invention is not to be construed as limited in this regard. The precolation algorithm can be a configurable algorithm, which can be customer defined or vendor provided. Further in various contemplated embodiment, the precolation algorithm can utilize a maximum value from nodes at the same level, can utilize an average value, can utilize a statistical mean value, and the like.

FIG. 3 provides a code for a sample mixed-initiative form 310 and a sample grammar document 340, where the form is able to be partially filled in based upon word confidence scores in accordance with an embodiment of the inventive arrangements disclosed herein. Code 310 and 340 can be performed in the context of system 100. Code 310 and 340 is consistent with examples provided in diagram 200. Form 310 can be written in any language that is able to be interpreted by a Voice server. As shown, form 310 is written in VoiceXML. Similarly, the grammar document 340 can be any fixed format grammar, such as an XML SRGS based grammar on an ABNF based grammar.

Form 310 is linked to an associated grammar called us_address.gram 312. The form 310 prompts a user for a full address 314 including street 316, city 318, state 320, and zip code 322.

As shown, grammar 340 is a ABNF grammar specified by the file, us_address.gram. Line 342 (e.g., public $us_address=$street $city $state $zipcode) indicates that street, city, state, and zipcode are subrules of the grammar 340. After the subrule-declaration, semantic interpretation statement 344 sets the results of each sub-rule to an associated Voice XML field (e.g., $.street=$street; $.city=$city; $.state=$state; $.zipcode=$zipcode).

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A speech processing method, implemented at least in part by at least one computer comprising at least one hardware processor, the method comprising:
   prompting, via the at least one computer, for a spoken response that provides input for multiple elements;
   receiving at the at least one computer, a single spoken utterance comprising content for multiple elements, each of which is mapped to a data field;
   speech-to-text converting, using the at least one computer, the spoken utterance to derive values for each of the multiple elements;
   determining, using the at least one computer, that an utterance-level confidence score for the spoken utterance falls below an associated certainty threshold;
   ascertaining, using the at least one computer, element-level confidence scores for each of the derived elements;
   determining, using the at least one computer, that a first set of the multiple elements each has an element-level confidence score above an associated certainty threshold and that a second set of the multiple elements each has an element-level confidence score below an associated certainty threshold;
   storing, on the at least one computer, values for data fields mapped to elements in the first set; and
   prompting, via the at least one computer, for a new spoken response that provides input for elements of the second set.

2. The method of claim 1, wherein the ascertaining step is based on word-level confidence scores.

3. The method of claim 2, further comprising:
   establishing a configurable percolation algorithm, said percolation algorithm defining a manner in which confidence scores associated with child nodes of a parse-tree are applied to parent nodes of the parse-tree, wherein leaf nodes of the parse-tree are words, each associated with one of the word-level confidence scores.

4. The method of claim 2, said method further comprising:
   for an element node having multiple component nodes, determining component-level confidence scores for each of the component scores for each of the component nodes; and
   setting the element-level confidence score to a lowest one of the determined component-level confidence scores.

5. The method of claim 1, wherein the multiple elements are defined within a mixed-initiative form.

6. The method of claim 5, wherein the mixed-initiative form is written in a standardized language that includes language constructs for specifically handling voice input.

7. The method of claim 5, wherein the mixed-initiative form is written in VoiceXML.

8. The method of claim 5, wherein the mixed-initiative form is associated with a grammar document which defines a recognition grammar used in the speech-to-text converting step.

9. The method of claim 8, wherein the grammar document is written in an augmented Backus-Naur form (ABNF) based language.

10. The method of claim 8, wherein the grammar document is written in an Extensible Markup Language (XML) Speech Recognition Grammar Specification (SRGS) based language.

11. The method of claim 1, further comprising:
    repeating the steps of claim 1 in a recursive fashion until an utterance-level confidence score for a received utterance falls above an associated certainty threshold at which point data fields mapped to the received utterance are all completed.

12. The method of claim 1, wherein said steps of claim 1 are performed by at least one machine in accordance with at least one computer program stored in a computer readable media, said computer programming having a plurality of code sections that are executable by the at least one machine.

* * * * *